June 12, 1934.  L. B. CALKINS  1,962,981
ELECTRIC HEATER
Original Filed June 24, 1931  3 Sheets-Sheet 1
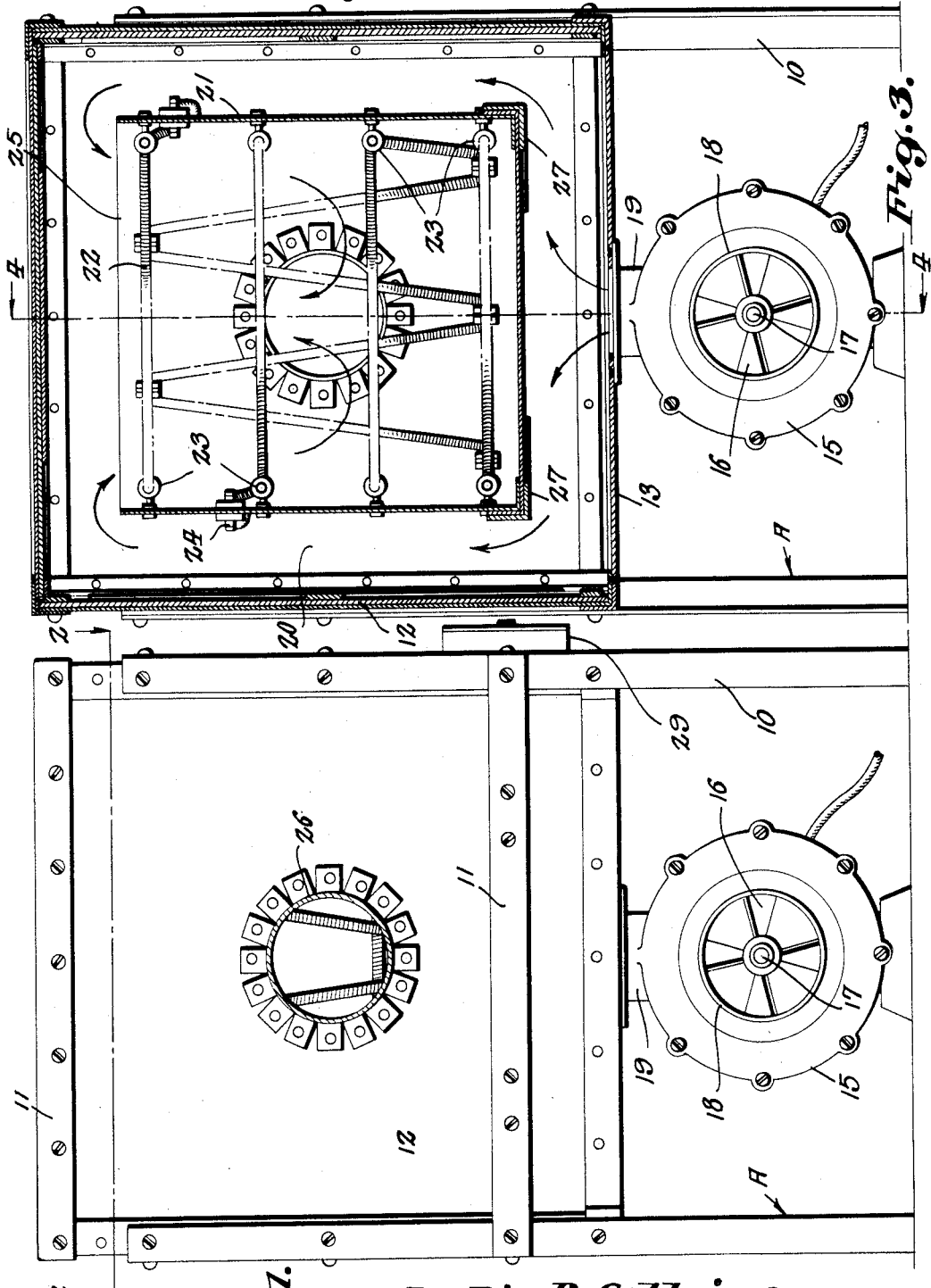
Leslie B. Calkins, INVENTOR
BY Victor J. Evans and Co. ATTORNEY

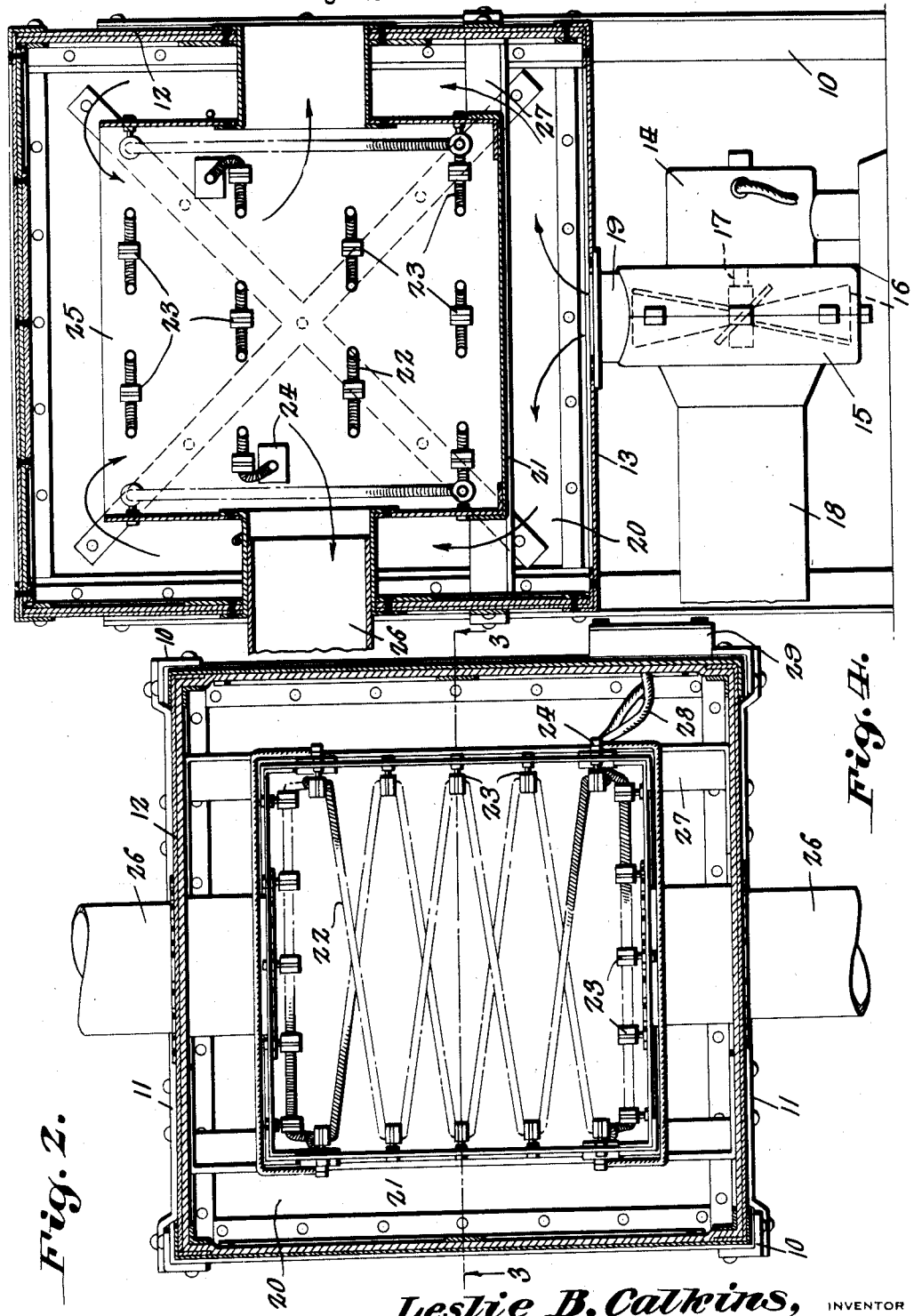

June 12, 1934.                L. B. CALKINS                1,962,981
                              ELECTRIC HEATER
            Original Filed June 24, 1931      3 Sheets-Sheet 3
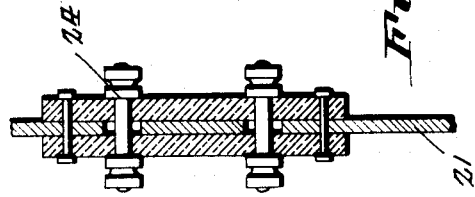
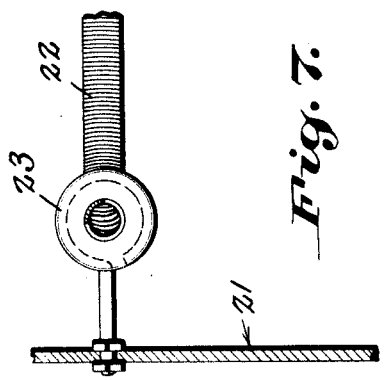
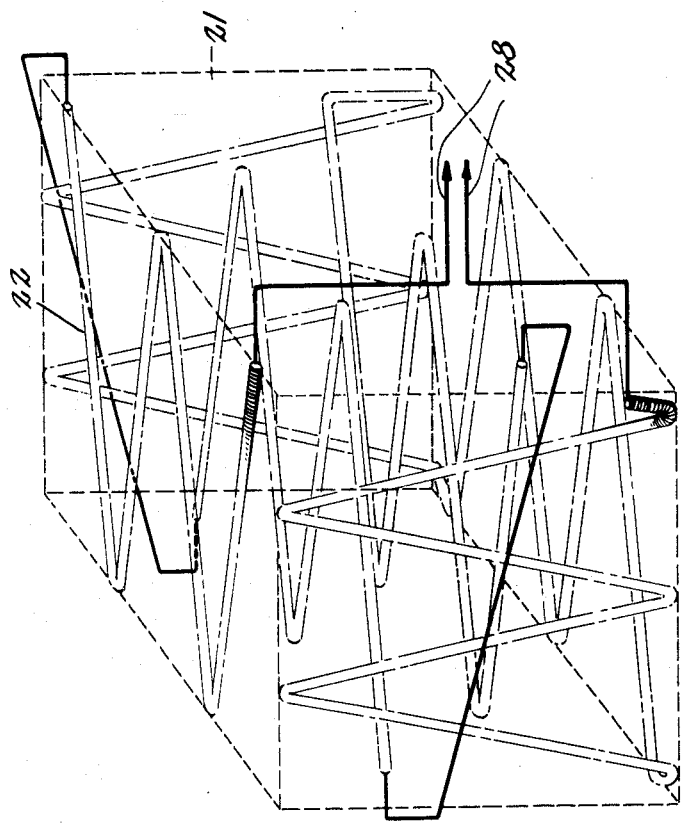
Leslie B. Calkins, INVENTOR
BY Victor J. Evans
and Co.   ATTORNEY Patented June 12, 1934

1,962,981

UNITED STATES PATENT OFFICE 1,962,981

ELECTRIC HEATER

Leslie B. Calkins, Elsinore, Calif., assignor of ten per cent to Leonard J. Difani, Riverside, Calif., five per cent to Gale R. Gough and three per cent to Earl L. Engberg, both of Elsinore, Calif., and five per cent to Paul J. Ondryska, five per cent to Emile P. Girard, five per cent to Herman Waechter, and ten per cent to Jack Lind, all of Murrieta, Calif.

Application June 24, 1931, Serial No. 546,544
Renewed March 2, 1934

1 Claim. (Cl. 219—39)

The invention relates to an electric heater and more particularly to a forced draft electric heater.

The primary object of the invention is the provision of a heater of this character wherein cold air is admitted and forced into a heating chamber for circulation therein prior to its distribution and within this chamber is an electric heating unit which heats the air and the heat circulating therein in itself results in insulating the chamber about the heating unit and thus minimizes lost radiation.

Another object of the invention is the provision of a heater of this character wherein the air forced into the heating chamber thereof will have a path across the heating unit to such an extent that the heating element of said unit never reaches a heating point where there is any lost heat and in this manner maximum heating qualities are attained with resultant economy in electric current expense.

A further object of the invention is the provision of a heater of this character, wherein the construction thereof is novel in form so that a continuous forced draft is had about the heating unit with the result that the air is heated to a maximum degree prior to distribution of the heated air from the heater.

A still further object of the invention is the provision of a heater of this character which is extremely simple in construction, thoroughly reliable and efficient in its purpose, strong, durable, neat and attractive in appearance, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is an elevation of the heater constructed in accordance with the invention.

Figure 2 is a sectional view on the line 2—2 of Figure 1 looking in the direction of the arrows.

Figure 3 is a vertical longitudinal sectional view through the heater, taken on the line 3—3 of Figure 2.

Figure 4 is a sectional view on the line 4—4 of Figure 3 looking in the direction of the arrows.

Figure 5 is a perspective diagrammatic view of the heating unit employed in the heater.

Figure 6 is a detail sectional elevation showing the binding post between the electric current supply and the heating unit.

Figure 7 is a detail plan view of one of the hangers for the heating coil of the heating unit.

Similar reference characters indicate corresponding parts throughout the several views in the drawings.

Referring to the drawings in detail, the heater comprises a frame structure A including corner uprights 10 united with top and bottom cross pieces 11 to which are riveted the outer closure walls 12, these with the cross pieces 11 in their juncture with the uprights 10 constitute the body of the heater. Located beneath the bottom 13 of the body of the heater is an electric motor 14 having mounted thereon a fan casing 15 in which is arranged a bladed fan 16 operated from the driving shaft 17 of the motor 14 and opening into one side of the casing 15 at its center is a cold air inlet conduit 18 from which is drawn cold air by the fan 16, the latter forcing such air upwardly through a delivery connection 19 into the body of the heater and this body constitutes a closed heating chamber 20.

Within the heating chamber 20 of the body supported elevated from the bottom 13 and also correspondingly spaced from the walls 12 as well as the top of said body is a heating unit drum 21, the latter having arranged therein the heating unit 22 in the form of a heating coil supported in hangers 23 carried by said drum and such coil is in electrical connection with the binding or connecting post 24 for the leads to current wires of a house wiring system or other electric current source of supply.

The drum 21 for the heating unit 22 is closed on all sides and bottom with the top 25 thereof open so that the cold air admitted to the chamber 20 will circulate about the drum 21 and into the holder through the open top 25 thereof whence the heated air acted upon by the heating unit 22 will be distributed from this drum 21 through laterals 26 leading from the drum through opposite walls 12 of the body of the heater and may be conveyed without the same for heating purposes.

The drum 21 in its positioned relation in the chamber 20 is supported upon brackets 27, these being suitably united with the walls 12 of the body at opposite sides thereof.

The current supply wires 28 engaged with the binding post 24 for the delivery of current to the heating element 22 may have arranged therein a suitable cut off switch (not shown) confined within a switch box 29 on the body of the heater.

It will be apparent that cold air will be admitted through the conduit 18 and forced by the fan 16 into the chamber 20 whence such air will circulate about the drum 21 and the heating element 22 will cause the heating of the air in the circuitous course thereof within the drum to the laterals 26 and in this manner maximum heating qualities of the heater is assured and at the same time a minimum consumption of electric current by the heating unit as the entire heated air is inclosed and confined about the heating unit before the discharge thereof through the laterals 26 to a point or points for heating purposes.

From the foregoing it is thought that the construction and operation of the heater will be clearly understood and therefore a more extended explanation has been omitted.

What is claimed is:—

A heater of the character described comprising a closed body, a fan having a casing beneath the body and communicative therewith through its bottom, a heating drum of considerably less size than the body and located centrally within the latter, said heating drum being closed at its sides, ends and bottom, the opposite sides of the drum being provided with openings, flues located in said openings and passed through companion sides of said body and supporting the drum within the latter, eye members mounted in the drum opposite each other and staggered one with respect to another, an electric heating coil trained through the eye members in a zigzag course within the drum and having electrical connection with a source of current supply, and insulators fitted in the eye members to accommodate the coil.

LESLIE B. CALKINS.